(12) United States Patent
Iwama et al.

(10) Patent No.: US 7,966,629 B2
(45) Date of Patent: Jun. 21, 2011

(54) OPTICAL DISC DEVICE

(75) Inventors: Mitsuhiro Iwama, Kawasaki (JP); Takashi Ishii, Kawasaki (JP); Kunio Omi, Kawasaki (JP); Tsuneo Suzuki, Kawasaki (JP); Kouzou Ohno, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 657 days.

(21) Appl. No.: 11/412,945

(22) Filed: Apr. 28, 2006

(65) Prior Publication Data
US 2006/0245330 A1  Nov. 2, 2006

(30) Foreign Application Priority Data
Apr. 28, 2005  (JP) .................... 2005-132262

(51) Int. Cl.
*G11B 33/02*  (2006.01)
(52) U.S. Cl. .................... 720/646; 720/648; 720/650
(58) Field of Classification Search .................. 720/601, 720/606, 613, 643–648, 650–651, 655; 361/685; 360/98.01
See application file for complete search history.

(56) References Cited

U.S. PATENT DOCUMENTS

| | | | | |
|---|---|---|---|---|
| 5,063,474 A * | 11/1991 | Igarashi | .................... | 361/220 |
| 5,070,216 A * | 12/1991 | Thornton | .................... | 174/355 |
| 5,673,159 A * | 9/1997 | Jinbo et al. | .................... | 360/98.01 |
| 5,684,775 A * | 11/1997 | Tanaka et al. | .................... | 720/650 |
| 6,198,712 B1 * | 3/2001 | Okamoto | .................... | 720/648 |
| 6,392,975 B2 * | 5/2002 | Arai | .................... | 720/610 |
| 7,134,128 B2 * | 11/2006 | Matsui et al. | .................... | 720/650 |
| 7,331,053 B2 * | 2/2008 | Guo et al. | .................... | 720/600 |
| 7,340,754 B2 * | 3/2008 | Yamauchi et al. | .................... | 720/651 |
| 7,363,638 B2 * | 4/2008 | Peng | .................... | 720/650 |
| 2004/0163094 A1 * | 8/2004 | Matsui et al. | .................... | 720/650 |
| 2005/0223398 A1 * | 10/2005 | Fujimura et al. | .................... | 720/601 |

FOREIGN PATENT DOCUMENTS

| | | | |
|---|---|---|---|
| JP | 5-72364 | | 3/1993 |
| JP | 8-171787 | | 7/1996 |
| JP | 2001-67851 | | 3/2001 |
| JP | 2003-218574 | | 7/2003 |
| JP | 2003218574 A | * | 7/2003 |
| JP | 2003-262818 | | 9/2003 |
| JP | 2005-78771 | | 3/2005 |

OTHER PUBLICATIONS

English-Machine Translation of JP 2005078771 A, Mar. 24, 2005.*

* cited by examiner

*Primary Examiner* — Craig A. Renner
*Assistant Examiner* — Carlos E Garcia
(74) *Attorney, Agent, or Firm* — Oblon, Spivak, McClelland, Maier & Neustadt, L.L.P.

(57) ABSTRACT

An optical disc device includes a conductive member of a bezel assembly with openings formed by a plurality of parting lines, and gaskets are attached to the upper and lower sides of the conductive member using conductive adhesion bond.

1 Claim, 2 Drawing Sheets

OPTICAL DISC DEVICE

CROSS-REFERENCE TO RELATED APPLICATIONS

This application is based upon and claims the benefit of priority under 35 U.S.C. §119 from the prior Japanese Patent Application No. 2005-132262, filed on Apr. 28, 2005; the entire contents of which is incorporated herein by reference.

BACKGROUND OF THE INVENTION

1. Field of the Invention

The present invention relates to an optical disc device, and more particularly, to an optical disc device that reduces influence of an electric wave coming from outside of the optical disc device and an electric wave originating from inside the optical disc device.

2. Description of the Related Art

In situations where maintenance is not performed, electric devices may be subject to functional decline, malfunction, shutoff, and recorded data may be lost due to the influence of eradiated electromagnetic waves coming from other nearby devices. Especially, an electromagnetic wave eradiated from a radio device may have an influence, such as resonance, on other electronic devices. As for countermeasures against the radio-frequency interference and immunity, various research has been done.

For example, concerning electronic devices having mounted thereto a portable recording medium, there is suggested an electronic device which is configured such that a metal plate, etc. of the insertion surface of a portable recording medium does not resonate with an electric wave generated outside of the device (for example, Jpn. Pat. Appln. Laid-Open Publication No. 2001-67851).

Furthermore, there is suggested an image forming device in which an opening provided at a metal housing to make a laser beam go through operates as a slot antenna. A conductive member is arranged between both sides in the longitudinal direction of the opening provided at the metal housing to make a laser beam go through so as not to raise the slot antenna eradiation phenomenon in a frequency band in which two times the length of the opening in the longitudinal direction is set to one wavelength (for example, Jpn. Pat. Appln. Laid-Open Publication No. 2003-262818).

According to the conventional technique, the resonance point caused by an electric wave coming from outside and an internal electric wave is shifted by attaching a conductive member to a front surface opening of a device using a portable recording medium or an image forming device such that the longitudinal length is divided in half.

However, according to above-described conventional suggestion, it is assumed that the frequency of an electric wave coming from outside is 1.5 GHz, and noise standard up to 1 GHz is supposed. On the other hand, electric waves eradiated from various electronic devices are not definitively of a single kind.

Accordingly, even though a conductive member is attached to a single position to shift the resonance point, as in the conventional technique, a problem arises because the influence of the interference cannot be completely removed.

BRIEF SUMMARY OF THE INVENTION

According to exemplary embodiments of the present invention, the object of the present invention is to provide an optical disc device that can significantly reduce influence of an electric wave originating from outside of an optical disc device and an electric wave originating inside the optical disc device.

An exemplary embodiment of the present invention provide an optical disc device, comprising: a drawer, including a drive mechanism mounted thereon, the drive mechanism configured to hold an information recording medium and to control a rotation of the information recording medium; a cover arranged to protect the drawer from an upper direction and a lower direction, wherein the cover is made of a first conductive member; a bezel assembly arranged in the longitudinal direction of the drawer, the bezel assembly includes a second conductive member configured to form a plurality of parting lines; and a bezel attached to the drawer through the second conductive member; wherein, when the drawer is housed in the cover, an electrical connection is formed between the first conductive member and the plural parting lines formed by the second conductive member.

DETAILED DESCRIPTION OF THE INVENTION

Figure 1:
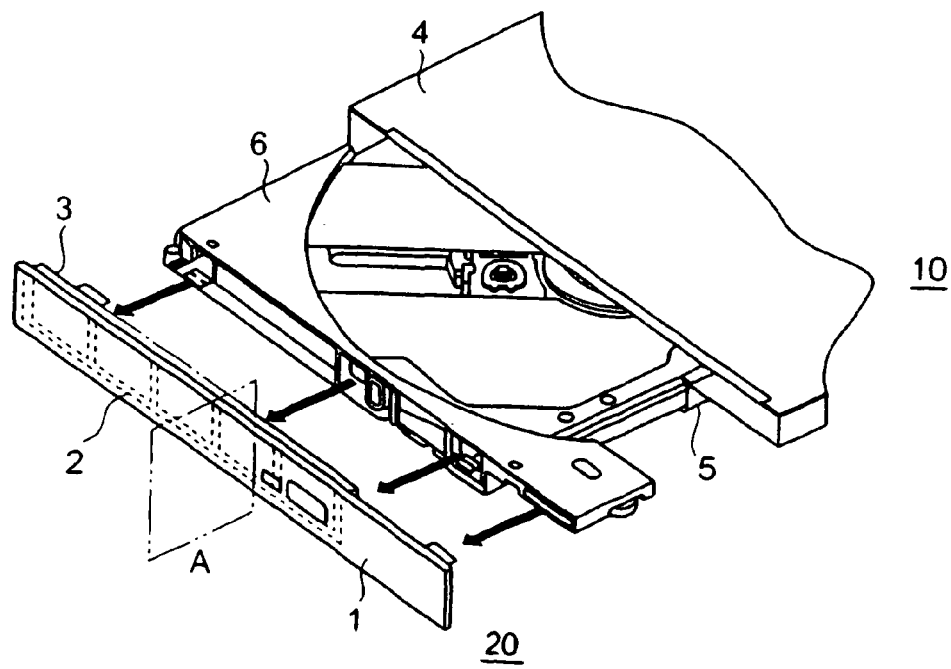
FIG. 1 shows a perspective view of an optical disc device according to an exemplary embodiment of the present invention.

According to an exemplary embodiment of the present invention, an optical disc device is provided that can significantly reduce the influence of an electric wave coming from outside the optical device.

The exemplary embodiments of the present invention will be described below with reference to the accompanying drawings. In the drawings, similar parts or components are indicated with the same reference numerals.

FIG. 1 shows a perspective view of an optical disc device 10 according to one embodiment of the present invention. As shown in FIG. 1, the optical disc device 10 includes a mechanical chassis that has mounted thereon a drive mechanism to hold an optical disc. The optical disc is an information recording medium. The drive mechanism also controls a rotation of the optical disc. The optical device also includes drawer 6 on which the mechanical chassis is mounted, and which can be let into and let out from the device main body. A top plate 4 and a bottom plate 5 protect drawer 6 by covering drawer 6 from the upper direction as well as from the lower direction. A bezel assembly 20 is attached to drawer 6 in the longitudinal direction. Preferably, top plate 4 is arranged as the top member of optical disc device 10 and is an electric conductor. Similarly, it is preferred that bottom plate 5 is arranged as the bottom member of optical disc device 10 and is an electric conductor. Furthermore, an aluminum plate or a steel plate is desirable for plates 4 and 5. In the optical disc device 10, when the drawer 6 is housed inside optical device 10, respective electrical connections are formed so as to drive an optical disc to record or reproduce information.

Figure 2:
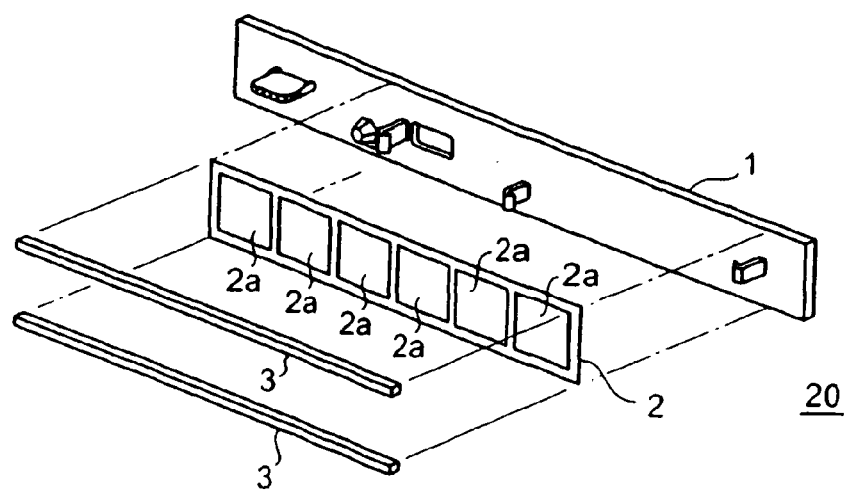
FIG. 2 shows an exploded perspective view of substantial part of a bezel assembly of the optical disc device according to the exemplary embodiment of the present invention.

FIG. 2 shows a perspective view of the bezel assembly 20 of the optical disc device 10 according to one embodiment of the present invention.

As described above, the bezel assembly 20 is fixed to the front side, or the drawable side, of the drawer 6. The bezel assembly 20 is composed of a bezel 1, a conductive member 2, and gaskets 3.

The bezel 1 is located at the front side of the optical disc device 10, and has an eject button, an LED button, etc., not shown.

As compared with the upper and lower sides as well as both the lateral sides of the optical disc device 10, the front side of the drawer 6 is directly affected by an electromagnetic wave coming from outside the optical device 10. In case a cellular phone etc. is placed near the drawer 6, it is necessary to protect the optical disc device 10 against resonance. For cellular phones, frequency bands of 800 MHz or 1.5 GHz are used. Accordingly, when the wavelength of those frequency bands is λ, the drawer 6 has to be designed such that the longitudinal dimension thereof does not accord with ½λ, ¼ λ, . . . . The longitudinal dimension of the drawer 6 is determined depending on devices which are used in combination with the optical disc device 10.

The conductive member 2 of the bezel assembly 20 according to the embodiment of the present invention has a plurality of parting lines. By unitedly coupling the plural parting lines, openings 2a are formed. Since the plural parting lines are unitedly coupled, the conductive member 2 can be manufactured easily, as will be explained later. Distances between the plural parting lines, or lateral widths of the respective openings 2a do not have to be equal with each other. The respective openings 2a may be diversely formed so long as lateral widths thereof avoid resonance.

In case the longitudinal dimension of the drawer 6 is 127 mm (one example in case of a slim drive), it is desired that the lateral width of the openings 2a be less than 55 mm. Furthermore, it is desired that the outside dimension of the conductive member 2 be smaller than that of the bezel 1. The reason for this is that the exterior appearance becomes inappropriate when the conductive member 2 protrudes from the bezel 1. It is desired that the conductive member 2 be made of copper foil, and may be formed as a unitary member by punching out portions corresponding to the openings 2a. Furthermore, the conductive member 2 may be formed into a frame. Adhesion bond is applied to one side of the conductive member 2, corresponding to the rear side of the bezel 1, and the conductive member 2 is attached to the rear side of the bezel 1.

The gaskets 3 are seal members provided with elasticity, and are further provided with an electrical conductive property. It is desired that the gaskets 3 be non-metallic gaskets, or soft gaskets, which can easily get a suitable sealing property, comparatively. Conductive adhesion bond is applied to one side of the gaskets 3, corresponding to the rear side of the bezel 1, and the gaskets 3 are attached to the rear side of the bezel 1.

As shown in FIG. 2, the conductive member 2 is fixed to the bezel 1 using adhesion bond, while the gaskets 3 are attached to the upper and lower sides of the conductive member 2 using conductive adhesion bond. Accordingly, the upper gasket 3 and the lower gasket 3 are electrically coupled by the conductive adhesion bond and the conductive member 2.

Figure 3:
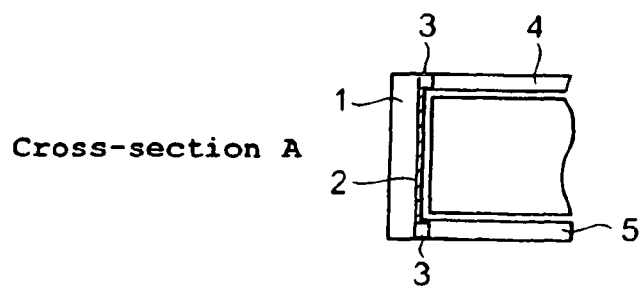
FIG. 3 shows a sectional view in which a drawer is housed in the bezel assembly.

FIG. 3 shows a sectional view indicating that the drawer 6 is housed.

As shown in FIG. 3, when the drawer 6 is housed, the gaskets 3 provided with elasticity are compressed to be in contact with the top plate 4 and the bottom plate 5. As described above, since the upper and lower gaskets 3 are electrically coupled, when the drawer 6 is housed, parts from the top plate 4 to the bottom plate 5 are electrically coupled to form a loop.

When viewing from the front side of the bezel 1, several conductive members are coupled from the top plate 4 to the bottom plate 5 in the lengthwise direction by the conductive member 2, forming a plurality of electrical loops. Accordingly, influence of an electric wave coming from outside the optical disc device 10 and an internal electric wave exerted on the optical disc device 10, that is, resonance caused by external and internal electric waves can be significantly reduced.

Figure 4:
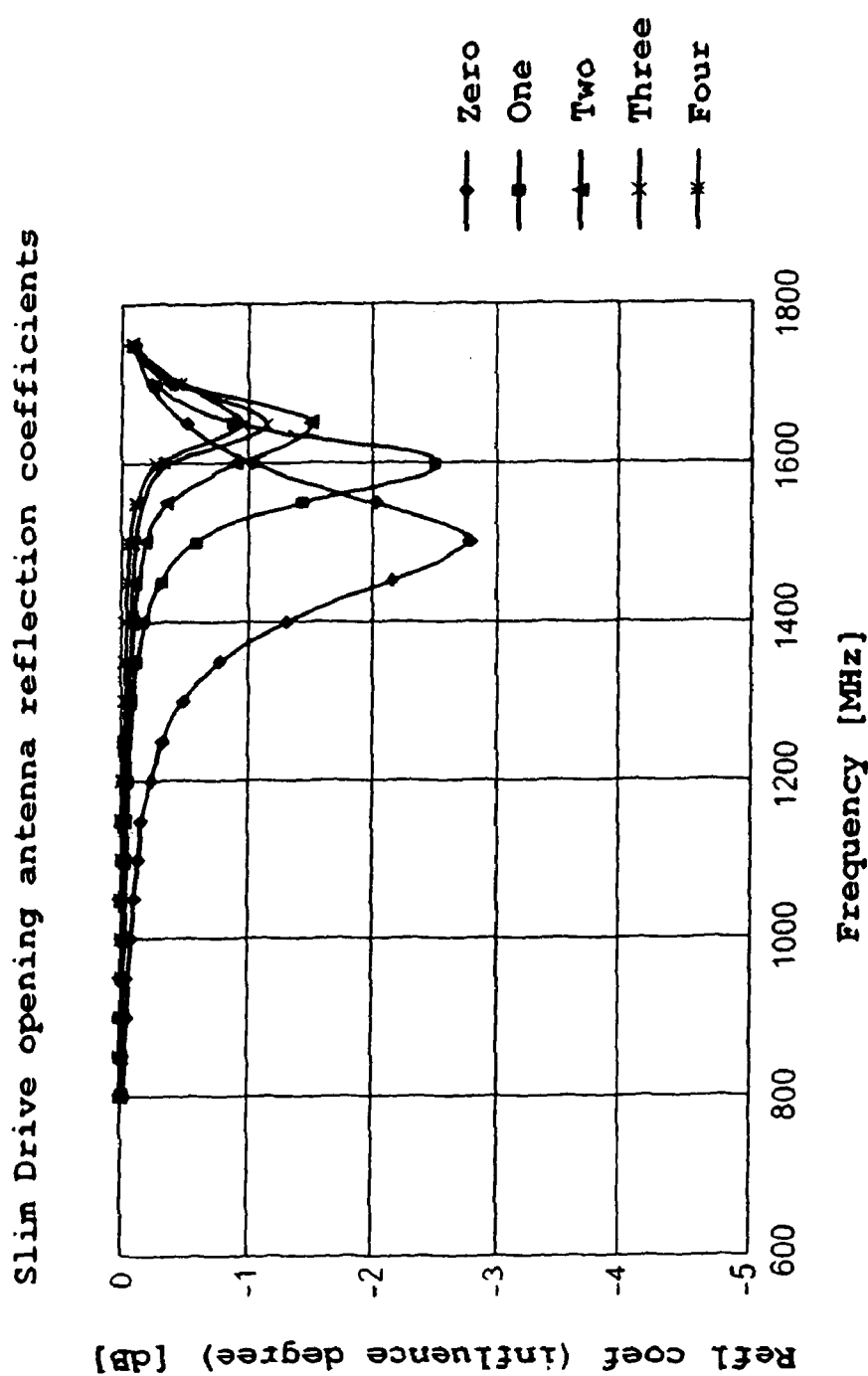
FIG. 4 shows a graphical representation indicative of the effect of the EMC countermeasure at an opening of a slim drive.

FIG. 4 shows reflection coefficients of an antenna owned by an opening of a slim drive housing that is mounted to a notebook-sized personal computer. In FIG. 4, the abscissa axis indicates frequency, while the ordinate axis Refl coef indicates the degree of influence.

As shown, it is indicated that, when going downward (minus direction) of the graph, the reflection amount becomes large.

Accordingly, the smaller the reflection amount is, the larger the effect of countermeasure for the EMC (electromagnetic compatibility) becomes.

As shown in FIG. 4, as compared with the case in which no countermeasure is taken (parting line: zero), in case of forming two openings at the conductive member 2 (parting line: one), the peak value of frequency is shifted to a higher value. In this case, some amount of improvement can be recognized, which improvement is small.

On the other hand, in case of forming three openings at the conductive member 2 (parting line: two), and in case of forming four openings at the conductive member 2 (parting line: three), not only the peak value of frequency is shifted to a further higher value but also significantly large improvement of being equal to or less than −1.5 dB can be recognized. In case of forming five openings at the conductive member 2 (parting line: four), the degree of improvement is made stable.

By attaching conductive members to multiple points, an effect of a countermeasure against influence of a sensitive electric wave such as CPI (Cellular Phone Immunity) is brought about, while a similar effect is brought about concerning influence of EMI (electromagnetic interference).

While the invention has been described in accordance with certain preferred embodiments, it should be understood that the invention is not limited to the embodiments, but various modifications, alternative constructions or equivalents can be implemented without departing from the scope and spirit of the present invention. Furthermore, by arbitrarily combining the plural components disclosed in the embodiments, various inventions can be realized. Furthermore, some components may be removed from all the components disclosed in the embodiments, while components of different embodiments may be arbitrarily combined.

What is claimed is:

1. An optical disc device, comprising:
   a drawer that has mounted thereon a drive mechanism to hold an information recording medium and to control rotation of the information recording medium;
   a top plate and a bottom plate that cover top and bottom of the drawer so as to protect the drawer;
   a bezel that is mounted in a longitudinal direction on a front side of the drawer;
   a conductive member that is bonded on an inner side of the bezel, and has a frame shape to avoid resonance with an electromagnetic wave that comes from outside or from inside the optical disc device, the frame having three or more openings that are formed by coupling two or more parting lines in an integral manner; and
   an upper and a lower conductive gaskets that are bonded on an upper and lower side of the conductive member of the frame in a direction of the drawer using conductive adhesion bond, and said upper and lower conductive gaskets having elasticity,
   the top plate, the upper gasket, the conductive member, the lower gasket, and the bottom plate are electrically connected to form a loop in a state where the drawer is enclosed by the top plate and the bottom plate,
   wherein the loop is formed by the top plate being directly connected to the upper gasket, the upper gasket being directly connected to the conductive member, the conductive member being directly connected to the lower gasket, the lower gasket being directly connected to the bottom plate, and the bottom plate being connected to the upper plate.

* * * * *